United States Patent

Soviche et al.

[15] 3,654,945
[45] Apr. 11, 1972

[54] REGULATING DEVICE IN WHICH THE PRESSURE OF A FLUID IS REGULATED

[72] Inventors: Gilles Andre Paul Soviche; Jean Pierre Bues, both of La Celle Saint-Cloud; Cyrille Francois Pavlin, Saclay; Edouard Maurice Eugene Aime Mace, Saint-Cyr L'Ercole, all of France

[73] Assignees: Entreprise de Recherches et D'Activites Petrolieres-Elf, Paris; Bertin & Cie, Plaisir, France

[22] Filed: Dec. 30, 1969

[21] Appl. No.: 889,162

[30]  Foreign Application Priority Data

Dec. 31, 1968  France..................................182515

[52] U.S. Cl......................................137/81.5, 235/201 ME
[51] Int. Cl...........................................................F15c 3/14
[58] Field of Search..........................137/81.5; 235/201 ME

[56]  References Cited

UNITED STATES PATENTS

| | | |
|---|---|---|
| 3,232,095 | 2/1966 | Symnoski et al..................137/81.5 X |
| 3,250,285 | 5/1966 | Vockroth, Jr........................137/81.5 |
| 3,260,271 | 7/1966 | Katz..................................137/81.5 X |
| 3,276,463 | 10/1966 | Bowles.................................137/81.5 |
| 3,292,648 | 12/1966 | Colston...........................137/81.5 X |
| 3,467,122 | 9/1969 | Jones..................................137/81.5 |
| 3,491,784 | 1/1970 | Lilly....................................137/81.5 |
| 3,509,775 | 5/1970 | Evans...............................137/81.5 X |
| 3,521,655 | 7/1970 | Glaze..................................137/81.5 |
| 3,529,612 | 9/1970 | Rausch...............................137/81.5 |

*Primary Examiner*—Samuel Scott
*Attorney*—Brufsky, Staas, Breiner and Halsey

[57]  ABSTRACT

An improved regulating device, in which the regulation is effected by regulating the pressure of a fluid the generating pressure of which is variable, wherein the improvement comprises, in combination, a detector of changes in a physical magnitude, displacement of this detector moves by mechanical means a variable obstruction placed at the outlet of a power jet, the output of which is amplified and supplies an output pressure which controls a pneumatic device acting on the said physical magnitude.

6 Claims, 9 Drawing Figures

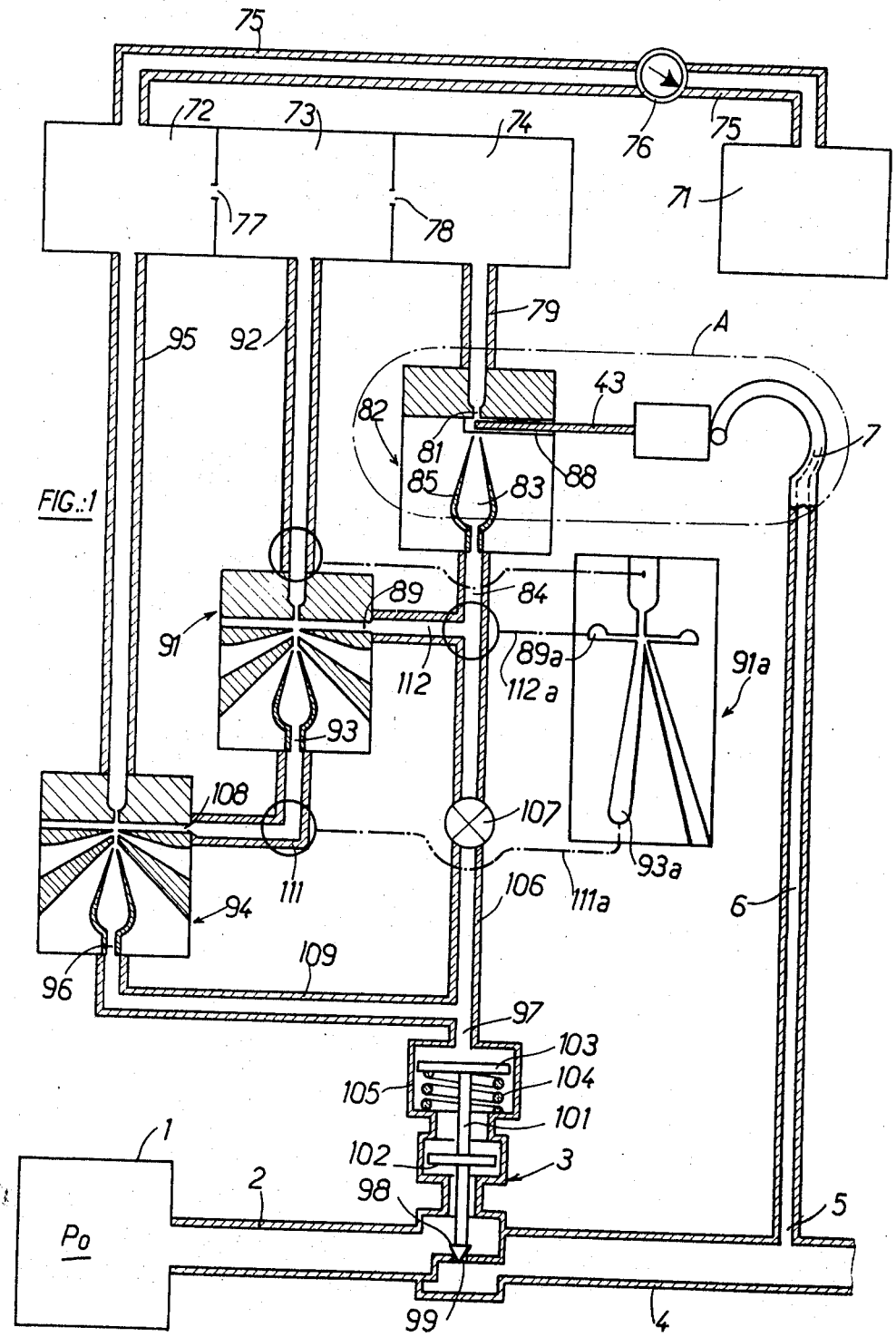
FIG.:1

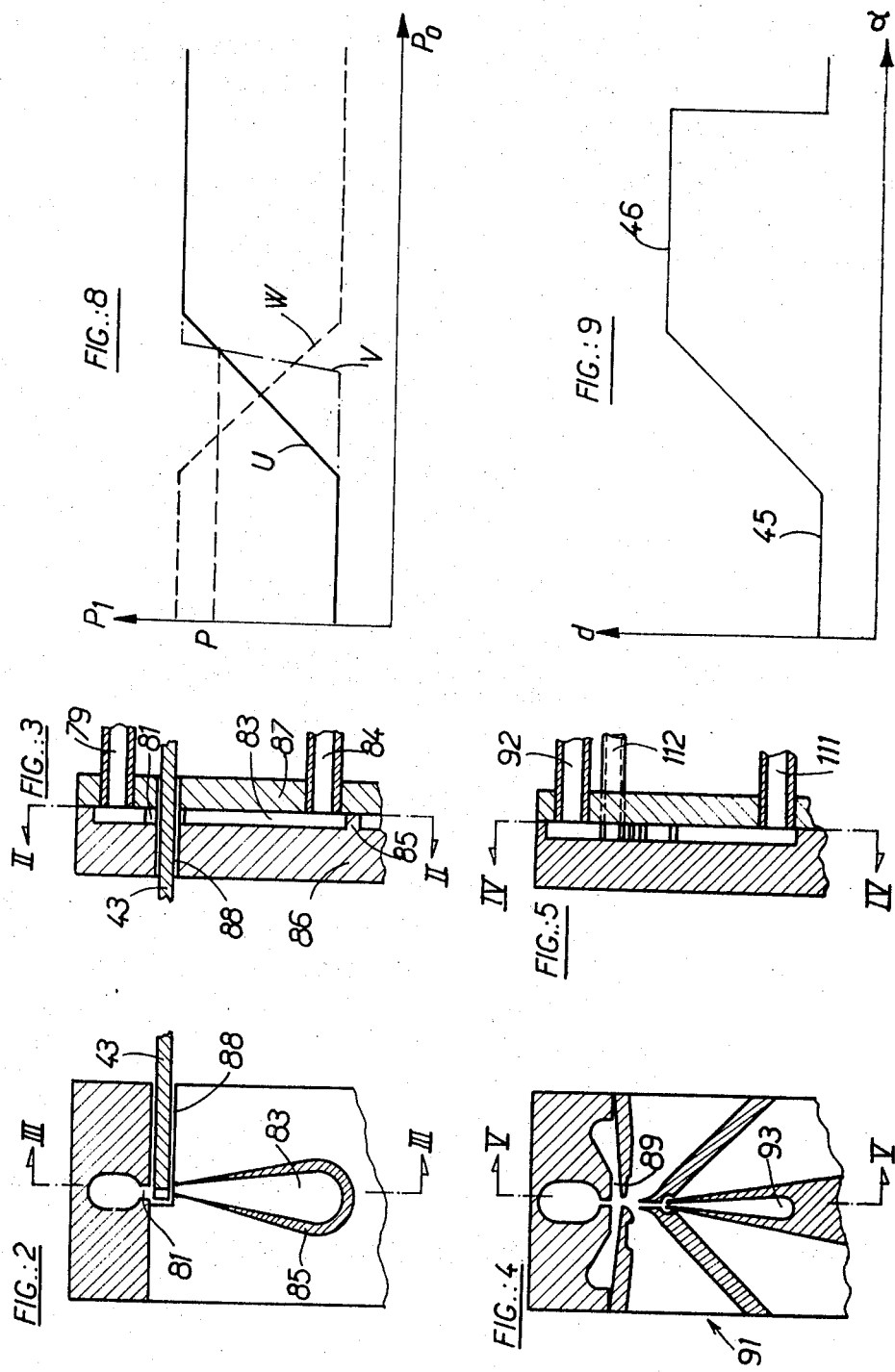

REGULATING DEVICE IN WHICH THE PRESSURE OF A FLUID IS REGULATED

DESCRIPTION

The invention relates, as indicated to regulating devices using the pressure of a fluid with variable output pressure.

The invention comprises a regulating device with a detector of changes in a physical magnitude, wherein the displacement of the detector moves by mechanical means a variable obstruction placed at the outlet of a deflector of a power jet, wherein the discharge is collected and amplified to supply an output pressure capable of controlling a pneumatic device which acts on the said physical magnitude.

It is an object of the invention to provide a device of the kind hereinbefore mentioned, adapted to regulate, according to the receiving member connected, either the delivery or the output pressure as a function of a mechanical movement at the inlet which is preferably supplied by a pressure-sensitive member. It is a further object of the invention to provide a device of the kind hereinbefore mentioned in which the regulating point and the sensitivity are adjustable independently of each other.

It is a further object of the invention to provide a device of the kind hereinbefore mentioned, which operates either proportionally or in an "all or nothing" manner. It is another object of the invention to provide a device of the kind hereinbefore mentioned which may be controlled by a direct or inverse operation.

The device according to the invention may be combined, on one hand, with any detector of a variation in a physical magnitude, such as, for example, a pressure, an output, a level, temperature, a speed, and the like which causes a displacement of the said detector, and on the other hand to any pneumatic device capable of acting on the physical magnitude under review.

Further advantages and features of the invention will become apparent from the following description with reference to the accompanying drawings, and from the appended claims.

In the drawings:

FIG. 1 is a diagrammatical view of the device according to the invention;

FIG. 2 is a cross-section along the line II—II in FIG. 3 and shows one embodiment of a jet deflector;

FIG. 3 is a cross-section along the line III—III in FIG. 2;

FIG. 4 is a cross-section along the line IV—IV in FIG. 5 showing an embodiment of a fluid power amplifier stage;

FIG. 5 is a cross-section along the line V—V in FIG. 4;

FIG. 8 is a graph showing the relation between the generating pressure $P_0$ and the utilization pressure $P_1$;

FIG. 9 shows the development of a cam.

Figure 6:
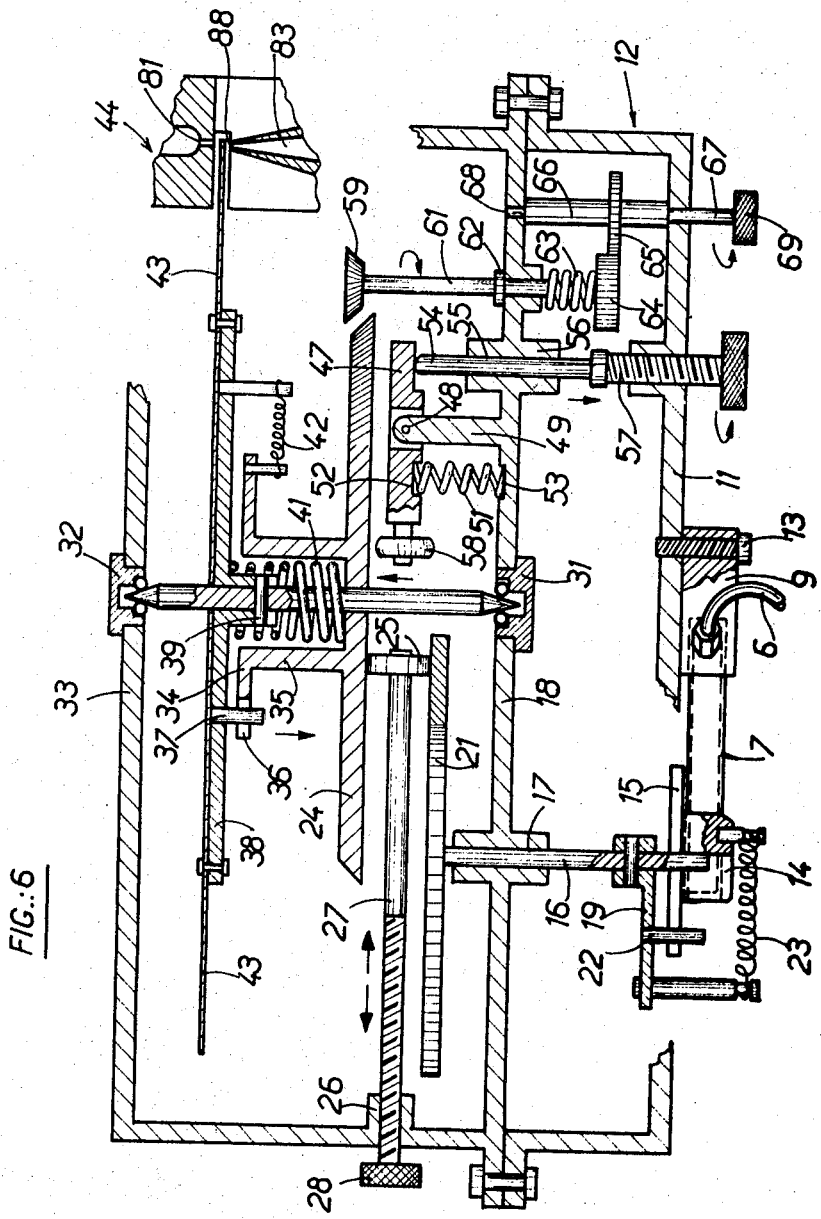
FIG. 6 is a cross-section of the detail A in FIG. 1 and shows the mechanical connection between the detector and the obstruction collaborating with a jet deflector.

The fluid, the pressure of which is to be controlled flows from a chamber 1, in which it is affected by a variable starting pressure $P_0$ through a conduit 2, the downstream end of which is provided with a valve 3 into a utilization conduit 4. The conduit 4 is equipped with a pressure pickup 5 connected by a conduit 6 to a deforming system 7 known in the art, for example, a bellows co-operating with a steel leaf or a socalled "Bourdon" tube.

Figure 7:
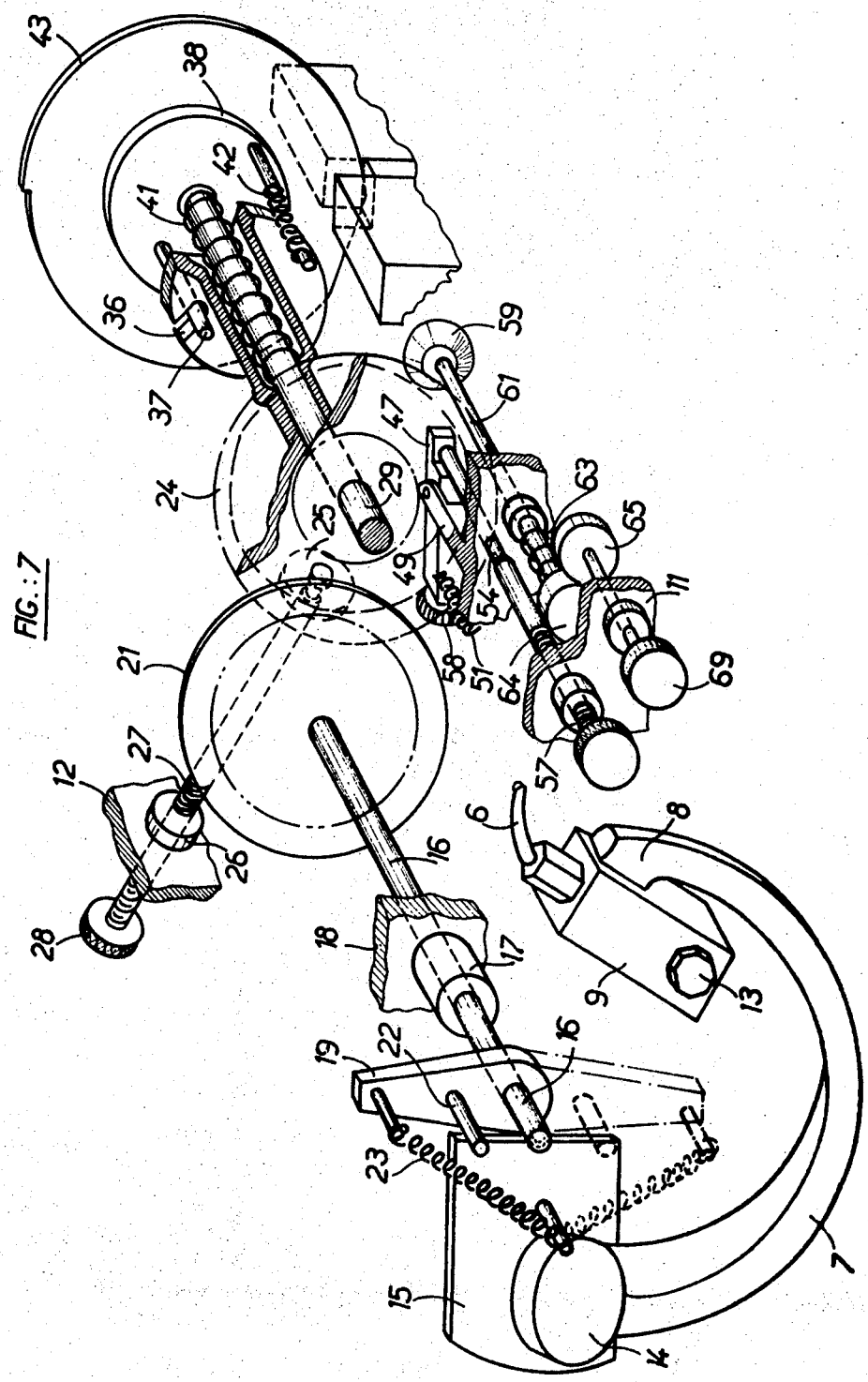
FIG. 7 shows the detail A in perspective.

The upstream end 8 of the deforming system 7 (see particularly FIGS. 6 and 7), is mounted by means of a stay 9 on the wall 11 of a box 12, the connection being made by any suitable means, for example by a screw 13.

The downstream end 14 of the system 7 is adapted to move under the action of the fluid in the conduit 6. This end 14 carries a plate 15 mounted in its plane of symmetry and on which rests, substantially in this plane of symmetry a shaft 16 located in a bearing 17 mounted in one wall 18 of the box. The shaft 16 carries on one side of the bearing 17 a lever 19 and on the other side a plate 21. The lever 19 co-operates with the said plate 15 by means of a pin 22 which is urged against this plate by a tension spring 23 mounted with one end on the lever 19 and with the other end in the plane of symmetry on the plate 15. It may be seen that the lever 19 may assume two positions relative to the plane of symmetry of the plate 15 ( shown in solid lines and in chain dotted lines in FIG. 7), according to whether it is located on one or the other side of the plate. These arrangements which permit, respectively, functioning in direct action or in inverse action will be explained in detail further below.

The plate 21 co-operates with a wheel 24 via a roller 25, the position of which relative to the plate 21 and to the wheel 24 may vary in consequence of the displacement of adjusting means, such as a threaded rod 27 which may be equipped, for example, with a milled knob 28 and screwed into a boss 26 of the housing 12.

The wheel 24 is mounted slidingly on a pivot 29 located in ball bearings 31 and 32 in the partition 18 and the wall 33 of the housing. The said wheel 24 has a crown 34 mounted by means of a flange 35 and comprising recesses 36 into which engage studs 37 of a disk 38 fixed by means of a key 39 on the pivot 29. Within the flange 35, a compression spring 41 is arranged and tends to push the wheel 24 and the disk 38 apart so as to retain the former in contact with the roller 25 which is itself in contact with the plate 21. A spring 42 is provided to eliminate play between the wheel 24 and the disk 38. On the disk 38 is mounted a cam 43, the circumference of which forms a variable obstruction at the outlet of a power jet of a jet deflector 44.

This cam, shown in development in FIG. 9, i.e. at the distance $d$ from the center as a function of the center angle $\alpha$, forms a progressive obstruction between two bearings 45 and 46.

The wheel 24 which is, in the operating position, in contact with the roller 25, may be detached from this roller by the following device in order to adjust the sensitivity of the arrangement.

A lever 47, mounted at 48 on an extension 49 of the partition 18 is affected on one side by a spring 41, working normally in compression and fixed to the lever at 52 and to the partition at 53, and on the other side by the end of a slide block 54, guided in a bore 55 in a boss 56 of the partition 18, and the other end of which is in contact with the end of a screw 57 screwed into the wall 11 of the housing.

By operating the screw 57, the lever 47 pivots under the action of the spring 51 about the fixed point 48 and rests through a roller 58 on the wheel 24. Since the force of the spring 51 is greater than that of the spring 41, the wheel 24 slides on the pivot 29 and approaches the disk 34, whilst simultaneously disengaging from the roller 25 which can now be easily adjusted. Moreover, the translatory movement of the wheel 24 permits the bevelled edge of this wheel to make contact with a pinion or a conical friction wheel 59, the shaft 61 of which passes through the wall 18 and is held in position by a shoulder 62 and a compression spring 63, resting on a reducing gear 64 which meshes with a gear 65, the shaft 66 of which pivots in journals 67 and 68, provided, respectively, in the wall 11 and in the partition 18. One end of this shaft carries a knurled knob 69. In this manner, the device may be adjusted to a reference pressure.

As shown in FIGS. 1 and 2, the logic circuit is supplied by a source 71 of pressurized fluid, supplying chambers 72, 73 and 74 through a conduit 75 through a pressure regulator 76. Preferably, the chambers 72, 73 and 74 are in series and communicate through orifices or diaphragms 77 and 78 so that the first chamber 72 has the highest pressure and the last chamber 74 the lowest pressure.

The chamber 74, in which the pressure is lowest supplies via a conduit 79 through a nozzle 81 a fluid jet deflector 82 (FIG. 2) the working channel 83 of which is located substantially in the extension but discontinuously, and in the axis of the said nozzle. This two-dimensional working channel 83 diverges towards the outlet conduit 84 and is, for example defined laterally by molding by a projection of a plate 86, to which is fixed another plate 87, as well known in the art.

The space between the said two plates and outside the projection is in communication with the surrounding medium.

A channel 88, provided in the two plates 86 and 87 at right angles to the axis and to the outlet of the nozzle 81, is adapted to receive the cam 43. This cam 43, the development of which is represented in FIG. 9, masks to a greater or lesser degree the outlet of the nozzle 81 and forms thereby a variable obstruction of the jet issuing from the said nozzle. This obstruction deflects the jet in proportion to its positioning. The working channel 83 of the deflector is connected by a conduit 112 to a control channel 89 of an amplifier 91, supplied via a conduit 92 from the chamber 73. The amplifier may be that described in French Pat. application No. 181,006, filed on Dec. 27, 1968 in the name of Bertin et Cie. The outlet 93 of the amplifier 91 is connected by a conduit 111 to a control channel 108 of a fluid amplifier which is substantially identical to the first amplifier and is supplied via a conduit 95 from the chamber 72. The outlet of this latter amplifier 94 is connected to the inlet of the pneumatic valve 3 by a conduit 109.

This valve 3, shown diagrammatically in FIG. 1, consists of a flap valve 98 which controls the orifice 99, forming the connection between the conduit 2 and the working conduit 4. This flap 98 is extended by a spindle 101 equipped with guide means 102 and ending in a plate or diaphragm 103 affected by a spring 104, normally working in compression. The whole valve is mounted in a housing 105.

A conduit 106 with a valve 107 connects the input 97 of the valve 3 with the control channel 89 of the said first amplifier.

The direct, proportional, operation is as follows:

The valve 107 is closed. The lever 19 is in the position shown by solid lines. An increase, for example, in the pressure in the working conduit 4 is transmitted through the conduit 6 to the deformation system 7, the displacement of which causes the rotation of the lever 19 and, via the shaft 16, of the plate 21. This plate 21 entrains through the roller 25 the wheel 24 which moves the cam 43 so as to reduce the obstruction caused by the jet deflector to increase the pressure in the working conduit 4. The fluid recovered in the working channel 83 increases and causes the deflection of the fluid-operated amplifier 91 to increase. The fluid recovered in the working conduit 93 of this amplifier decreases and with it also the deflection of the jet of the second amplifier 94. The fluid in the working channel 96 rises and drives back, in this type of valve, the flap 98 which has so far obstructed the orifice 99, controlling thereby the pressure in the working conduit to the desired value.

The inverse, proportional operation is as follows:

The valve 107 is closed. The lever 19 is in the position indicated by chain-dotted lines. The operating sequences are the same as in the preceding case, but the symmetrical position of the lever 19, compared with the function described above, reverses the movement of the cam and causes an increase of the obstruction in the case of an increase in the pressure in the working conduit. This kind of operation is suitable, for example, with a pneumatic valve, the opening of which is proportional to the pressure applied to its inlet.

The "all-or-nothing" operation is as follows:

The valve 107 is open.

In this type of operation, the counter-reaction coming from the outlet of the last stage is added to the pressure signal from the detector. In consequence, the output pressure rises and becomes stable at the maximum value of which the apparatus is capable. Inversely, if the pressure from the detector drops sufficiently to cause a drop in the output pressure, the counter-reaction also decreases so that the output pressure drops to its minimum value.

Replacement of amplifier 91 by an amplifier 91a permits of obtaining the "on-off" working ("all-or-nothing" operation), the valve 107 being closed.

FIG. 8 shows the generating pressure $P_0$ as a function of the working pressure $P_1$; the curves indicate different modes of operation in direct, proportional function, according to two different sensitivities adjusted by a different setting of the roller 25, wherein the working pressure is the pressure P. The curve W shows inverse, proportional operation.

Obviously, the invention described in the foregoing is not limited to the embodiment described and illustrated, and may be modified by any means known in the art. More particularly, the pressure regulator may control, through a suitable pneumatic device, any desired physical magnitude, variations of which may be translated into mechanical movements by means of a suitable detector, such as pressures, outputs (in which case the detector is preferably a differential pressure device), levels, temperatures, speeds and the like.

We claim:

1. A regulating device for controlling the magnitude of a physical entity comprising:
    a sensor of magnitude variations of said physical entity,
    pressure sensitive means for controlling said magnitude, and
    a modulatable fluidic system under the modulating control of said sensor and delivering a modulated pressure signal to said pressure sensitive means, said fluidic system comprising:
    three sources of motive fluid at different pressures, namely a low-pressure source, a medium-pressure source, and a high-pressure source,
    a power fluid discharge nozzle connected to said low-pressure source and producing a power stream,
    a movable modulator member cooperating with said nozzle and having a stream shearing rim of such progressively designed outline as to obstruct to a continuously varying extent the path of said stream when said rim progresses in stream shearing relationship crosswise of said path, whereby said stream is bodily deflected to a continuously varying degree as it issues from said nozzle,
    an adjustable mechanical transmission extending between said sensor and said modulator member for displacing said stream shearing rim across said path in response to said sensor,
    a power fluid collecting intake positioned opposite said nozzle, and
    a fluid amplifier with two stages in cascade, namely an upstream first stage and a downstream second stage, said upstream stage having a first power input connected to said medium-pressure source, a first control input connected to said intake and a first load output, and said downstream stage having a second power input connected to said high-pressure source, a second control input connected to said first load output and a second load output connected to said pressure sensitive means.

2. A regulating device as set forth in claim 1 wherein said fluid amplifier further comprises a feedback duct interconnecting said second load output and said first control input, and valve means in said feedback duct for selectively opening and cutting off said feedback duct.

3. A regulating device as set forth in claim 1 wherein said modulator member comprises a cam-shaped disk mounted for rotation about a pivot, and said mechanical transmission comprises a lever actuated by said sensor, a shaft driven by said lever, a plate fast with said shaft, a wheel rotatingly connected with said disk and mounted for rotation about said pivot, and a roller interposed between and engaging both said plate and said wheel.

4. A regulating device as set forth in claim 3 wherein the said wheel is adapted to slide axially on the said pivot.

5. A regulating device as set forth in claim 3 wherein the said roller is provided with means for adjusting its spacing relative to the centers of the plate and of the wheel in order to adjust the sensitivity of the transmission.

6. A regulating device as set forth in claim 3 wherein the said wheel may be disengaged from the roller by a member acting on the wheel and controlled by a spindle with an adjusting knob.